Dec. 9, 1941.　　　W. A. STRANTZ　　　2,265,405
PLOW ATTACHMENT
Filed April 18, 1940　　　2 Sheets-Sheet 1
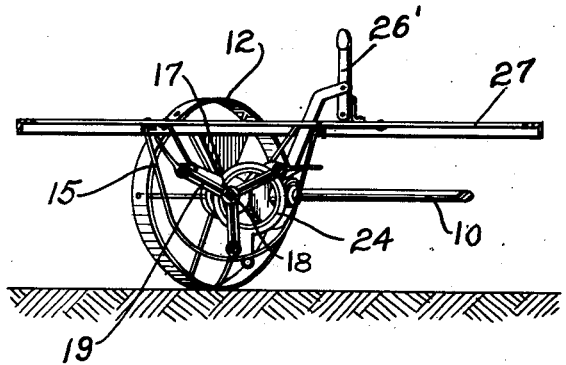
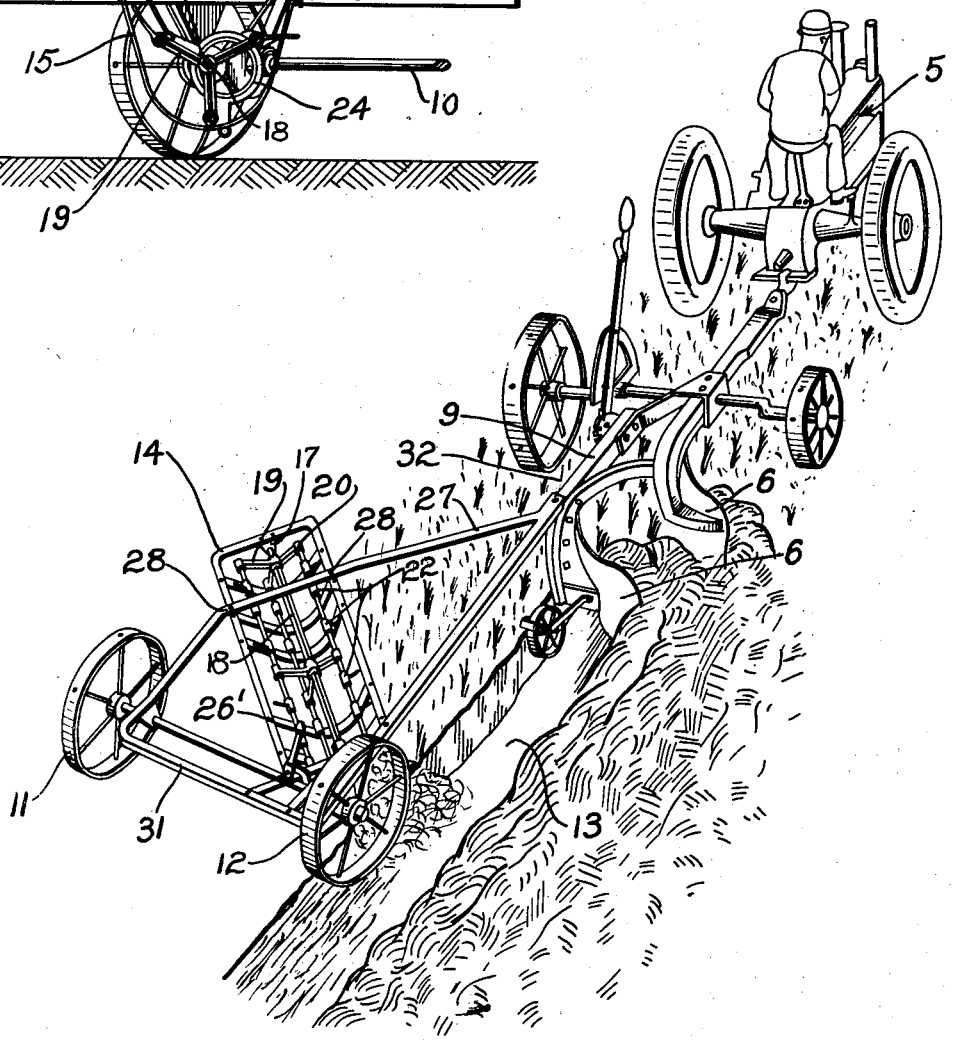
Inventor
William A. Strantz.
By Lacey & Lacey, Attorneys

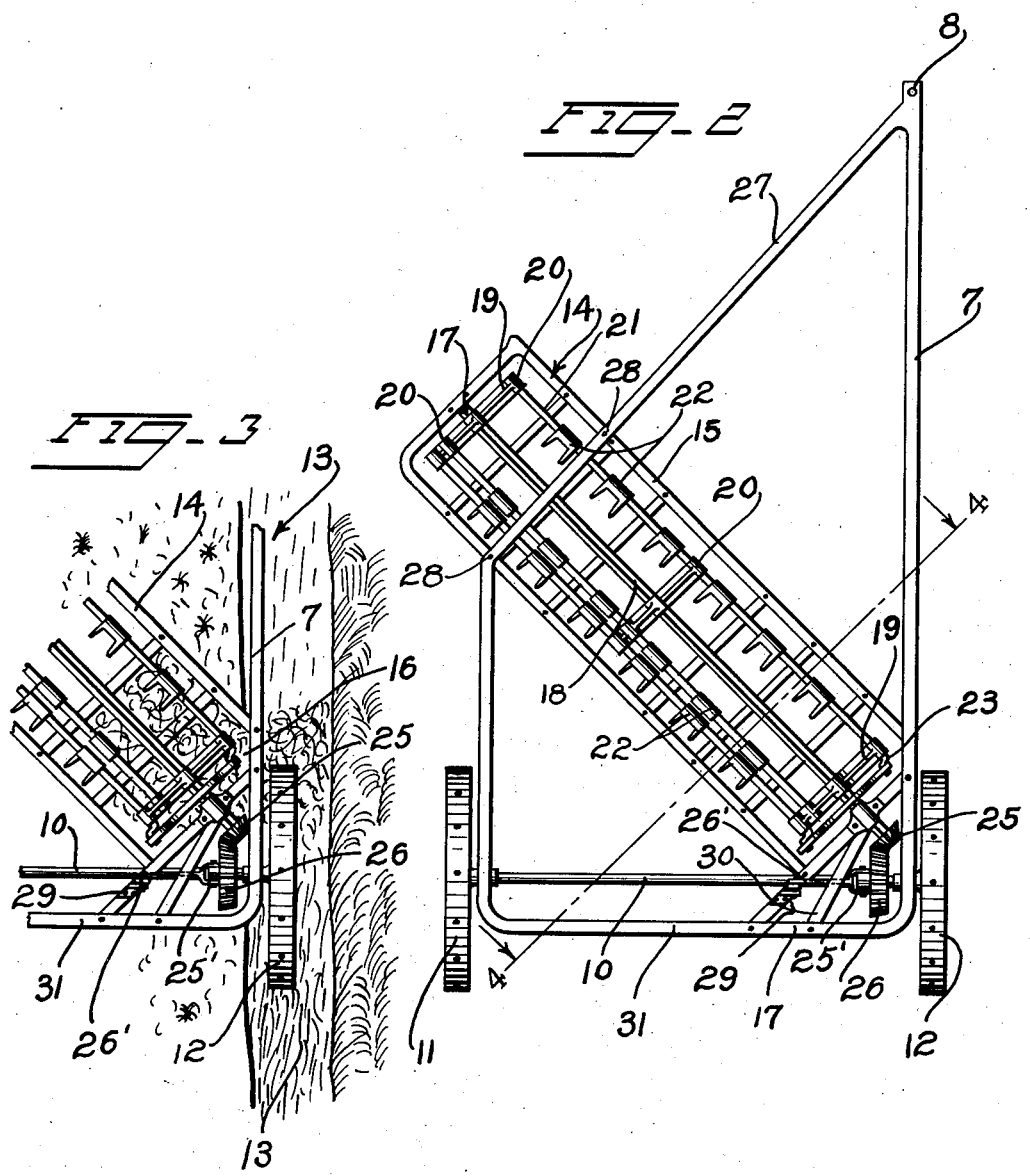

Patented Dec. 9, 1941

2,265,405

UNITED STATES PATENT OFFICE 2,265,405

PLOW ATTACHMENT

William A. Strantz, Chalmers, Ind.

Application April 18, 1940, Serial No. 330,388

4 Claims. (Cl. 97—34)

This invention relates to agricultural machines and more particularly to a method and apparatus for gathering and plowing under grass, weeds, trash and other surface debris to fertilize and enrich the soil preparatory to planting.

The object of the invention is to provide an agricultural machine having means for attachment to a tractor plow and adapted to gather and direct weeds, trash and other surface material into a furrow formed by said tractor plow as the latter travels over a field or other enclosure, means being provided for pressing or packing the material within the furrow so as to prevent scattering thereof and thus insure covering of said material with the soil by the action of the plow when making another furrow.

A further object is to provide an agricultural machine comprising a wheeled truck having a side delivery rake mounted thereon and disposed at an angle to the path of travel of a tractor plow and discharging into a furrow formed by the plow of said tractor, one of the wheels of the truck being mounted to travel in said furrow at the rear of the rake thereby to pack the material within the furrow as it is discharged from the side rake.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a perspective view of an agricultural machine embodying the present invention showing the same attached to a tractor plow with the inner wheel of the truck traveling in the plow furrow to pack the surface material therein, Figure 2 is a top plan view of the wheeled truck and its associated parts detached, Figure 3 is a detail top plan view showing how the trash or other material is discharged into the furrow, and Figure 4 is a detail transverse sectional view taken on the line 4—4 of Figure 2 and looking in the direction of the arrows.

The improved mechanism forming the subject-matter of the present invention may be used in connection with any type of plow, either motor driven or propelled by draft animals, and by way of illustration is shown applied to a tractor plow of conventional construction, in which 5 designates the tractor and 6 the plows disposed one in advance of the other and pivotally mounted on the rear end of the tractor, as shown.

The device consists of a wheeled truck comprising a substantially triangular shaped frame 7 preferably formed of reinforced angle iron and having its small end terminating in a coupling member 8 for detachable engagement with the plow beam 9. The wheeled truck is preferably offset with respect to the tractor so as to cause said truck to travel at the rear and to one side of the tractor, as best shown in Figure 1 of the drawings. Extending transversely of the rear end of the frame 7 is an axle 10 on which are journaled ground wheels 11 and 12, one of which is adapted to roll over the surface of the ground and the other within a furrow 13 formed by the plows 6. Mounted on the frame 7 in front of the wheels 11 and 12 and preferably disposed at an angle to the line of travel of the plows is a side delivery rake 14, the purpose of which is to gather weeds, grass, trash and other material on the surface of the ground at the rear of the tractor and continuously discharge said material into the furrow 13 as said furrow is formed by the plow.

The side delivery rake 14 comprises a skeleton frame or cradle 15 open at its top and having its inner end arranged to discharge material into the furrow, as indicated at 16 in Figure 3 of the drawings. Extending longitudinally within the frame or cradle 15 and journaled in suitable bearings 17 is a longitudinally disposed shaft 18 provided with spaced sets of radiating arms 19 formed with terminal sockets 20 in which are journaled rake bars 21 carrying rake teeth 22. The ends of the rake bars 21 at the inner end of the cradle 15 terminate in crank arms 23 and pivotally connected with said crank arms is an actuating spider 24 of standard construction. The inner end of the shaft 18 is extended longitudinally beyond the adjacent end of the cradle 15 and is provided with a beveled pinion 25 which meshes with a correspondingly beveled gear 26 secured to the axle 10 of the wheeled truck so that, as the truck travels over the surface of a field, rotary motion will be imparted to the arms 19 and cause the rake teeth 22 to gather grass, weeds and other trash on the surface of the ground in advance of the rake and feed the material thus gathered laterally into the furrow. The beveled gear 26 is keyed to the axle 10 but free to slide thereon, and operatively connected with said beveled gear is a yoke 25' to which is connected a shipper lever 26', by operating which the gears 25 and 26 may be moved into and out of mesh.

The frame of the side rake is bolted or otherwise rigidly secured to the intermediate portion of the diagonal front bar 27 of the wheeled truck, as indicated at 28, and suitable braces 29 and 30 extend between the rear end 31 of the truck and the forward end of the rake frame, as shown, so as to support the raking mechanism at the proper angle of inclination at all times.

In operation, the draft bar 8 of the wheeled truck is detachably secured to the plow beam 9 by a coupling pin or bolt 32 so that the wheeled truck and its associated parts will travel at the rear of the tractor in offset relation with respect thereto. As the tractor travels over the surface of a field or other enclosure, the plows 6 will form the furrow 13 and the rake mechanism will gather or collect all trash on the surface of the ground at the rear of the tractor and discharge said trash into the furrow 13 to be utilized for fertilizing and enriching the soil. During the forward movement of the tractor, the ground wheel 12 will compress or pack the surface material within the furrow 13 so as to prevent scattering or displacement thereof and when another furrow is formed by the plows 6, the material in the first-mentioned furrow will be covered with the soil to fertilize and enrich the same, as previously stated. Inasmuch as the wheeled truck is secured to the plow beam 9 when said plow beam is actuated to elevate the plows, the wheeled truck will be correspondingly elevated and thus lift the ground wheel 12 out of the furrow and the wheel 11 a corresponding distance above the surface of the ground to permit the device to make a turn at the end of a furrow.

It will, of course, be understood that the device may be made in different sizes and shapes and constructed of any suitable material and attached to any type of plow without departing from the spirit of the invention.

Having thus described the invention, what is claimed as new is:

1. The combination with a power driven plow, of a wheeled truck attached to the plow, and a gathering device carried by the truck for gathering and discharging surface material into the furrow formed by said plow, one of the wheels of the trunk serving to pack the material within the furrow.

2. The combination with a power driven plow, of a wheeled truck attached to the plow at the rear end thereof, and a side delivery rake carried by the truck and disposed at an angle to the path of travel of the plow for gathering and discharging surface material into a furrow formed by said plow, one of the wheels of the truck serving to pack the material within the furrow.

3. The combination with a power driven plow, of a wheeled truck disposed at the rear of the plow and movable therewith, and a side delivery rake carried by the truck for gathering and discharging surface material into a furrow formed by the plow, one of the wheels of the truck being mounted for travel within the furrow and in contact with the discharged material for compressing said material and prevent scattering thereof.

4. The combination with a power driven plow, of a substantially triangular frame detachably secured to the plow, ground wheels mounted on the rear end of said frame, and a side delivery rake mounted on the frame in advance of the ground wheels and disposed at an angle to the path of travel of the plow for gathering and discharging surface material into a furrow formed by said plow, one of said wheels serving to pack the material within the furrow.

WILLIAM A. STRANTZ.